(No Model.)
D. G. IRBY.
COTTON OR CORN STALK CHOPPER.
No. 587,209. Patented July 27, 1897.
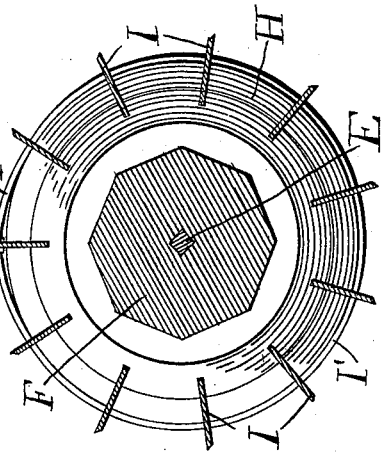
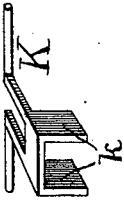
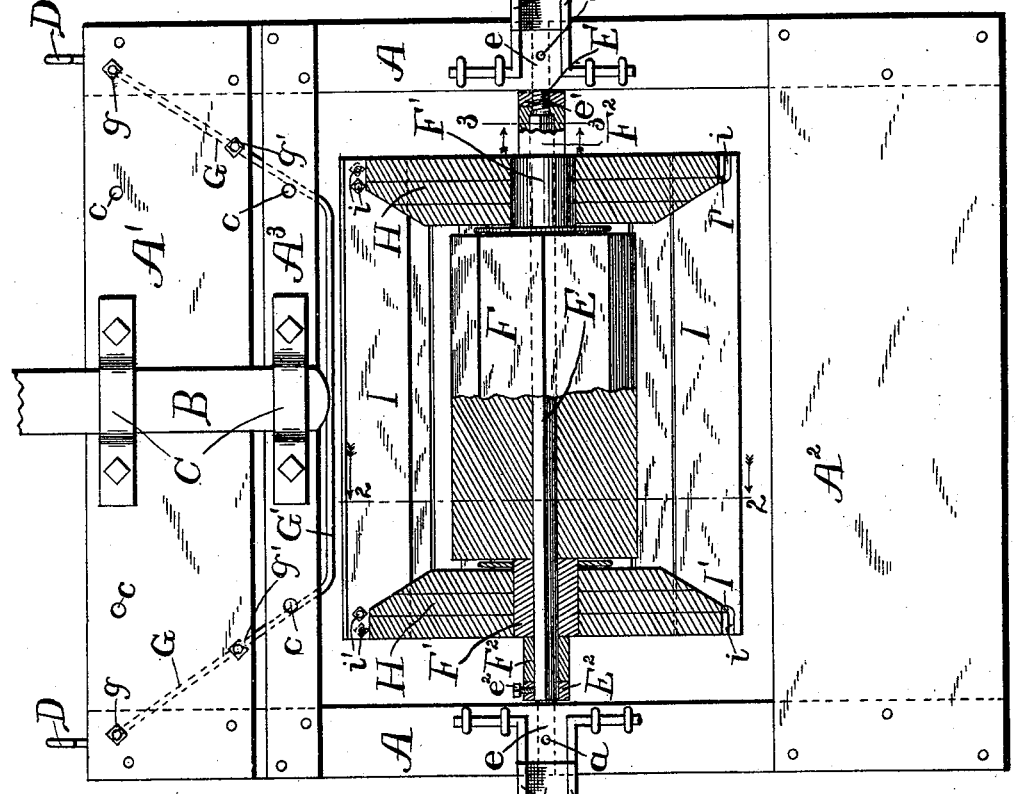

UNITED STATES PATENT OFFICE.

DABNEY GRAY IRBY, OF IRBY, GEORGIA.

COTTON OR CORN STALK CHOPPER.

SPECIFICATION forming part of Letters Patent No. 587,209, dated July 27, 1897.

Application filed April 8, 1897. Serial No. 631,292. (No model.)

*To all whom it may concern:*

Be it known that I, DABNEY GRAY IRBY, a citizen of the United States, residing at Irby, in the county of Irwin and State of Georgia, have invented certain new and useful Improvements in Cotton or Corn Stalk Choppers; and I do hereby declare the following to be a full, clear, and exact description of the invention, such as will enable others skilled in the art to which it appertains to make and use the same.

My invention relates to improvements in stalk-choppers adapted for use more particularly in chopping off the stalks or stubble left after harvesting a corn or cotton crop; and it consists in the novel device hereinafter described and claimed.

My invention will be understood by reference to the accompanying drawings, wherein the same parts are indicated by the same letters throughout the several views.

Figure 1 represents a top plan view, partly in section, of a stalk-chopper constructed in accordance with my invention. Fig. 2 represents a section through the chopping-cylinder and cleaning-roller, taken on the line 2 2 in Fig. 1 and looking in the direction indicated by the arrows. Fig. 3 is a section taken on the line 3 3 of Fig. 1 and looking in the direction indicated by the arrows, and Fig. 4 represents a detail perspective view of one of the pivoted plates shown in Fig. 1 for locking the cleaning-roller and axle against rotation.

The frame of my device comprises a pair of side timbers A A and end timbers or planks A' and A² at its front and rear ends, respectively. There may or may not, as desired, be an additional cross-timber, such as A³, near the front of the frame, as shown in Fig. 1.

The tongue or beam may be attached to the forward part of the frame in any suitable manner, such as by means of metal strips C, which embrace the rear end of the said tongue or beam and are bolted upon the forward cross-pieces A' and A³. An extra pair of bolt-holes may be provided through the cross-timbers on either or both sides of the frame, as shown at c in Fig. 1, to allow the adjustment of the tongue or beam to one or the other side of the middle of the frame when desired, as would be the case when it is desired to operate a pair of the choppers side by side upon two rows and have them both drawn by one team. In such an arrangement the second chopper would be connected alongside of the first by means of suitable cross-pieces and a brace connected with the tongue or beam of the first chopper, the team thus being allowed to straddle one row, as with a single chopper.

A pair of hooks D, attached to the forward part of the frame at either side of the tongue or beam, may be provided for the attachment of a pair of singletrees or stay-chains of a doubletree.

E represents a shaft upon which the chopping-cylinder and the cleaning-roller are mounted, as hereinafter more fully described. This shaft is rounded at its ends and journaled in the side timbers A A of the frame in any suitable manner, as shown at $e$ and $e$ in Fig. 1. A short portion of this shaft or axle E is screw-threaded, as shown at $e'$, for receiving a binding-nut E', for the purposes hereinafter described, and the shaft E is squared for the remainder of its length between the side timbers of the frame, as shown.

F represents a solid octagonal roller which is mounted upon the central portion of shaft or axle E and adapted to rotate therewith. Mounted upon the shaft or axle E, at either end of the said roller F, is a cylindrical sleeve F', which bears against the ends of the said roller and also rotates with the shaft E. A pair of squared collars or sleeves $F^2$ are mounted upon the shaft E at opposite ends thereof and bear upon the outer end of the cylindrical sleeves F', and the various parts are bound firmly together between the collar $E^2$, clamped upon one end of the shaft, by means of a screw-bolt $e^2$ and the nut E', engaging the screw-threaded portion $e'$ at the other end of the shaft, as shown in Fig. 1.

The chopping-cylinder is composed of end disks H H, which may be either solid or made up of two or more layers or disks, as shown in Fig. 1. These end disks H are mounted upon the cylindrical sleeves F' F', adjacent to the ends of the octagonal roller F, and may rotate upon the said sleeves. A plurality of chopping-blades are fitted into radial slots in the peripheries of the said disks H and protrude slightly beyond the outer ends of these slots, as shown in Figs. 1 and 2. The said chopping-blades are held securely in place by means of a pair of circular rods I', which engage in open-ended longitudinal slots $i$ at the end of each of the said chopping-blades, except the one where the ends of the said rods are secured. Instead of slots a pair of circular openings is provided in one of the chopping-blades near each end thereof, and one end of each rod passes through one of the holes of each pair and is secured by a nut which engages the screw-threaded end of the said rod and by means of which the said rod may be drawn taut and the parts firmly bound together, as shown at $i'$ $i'$ in Figs. 1 and 2.

The stalks are gathered together in front of the chopping-cylinder by means of a bent rod or frame comprising a pair of rearwardly-converging side pieces G and a rear end piece G', as shown partially in dotted lines and partially in full lines in Fig. 1. The forward ends of the side pieces G are bent upward and pass through openings in the front timber A', and are screw-threaded and provided with nuts thereon for securing the same. The said frame slopes downward toward its rear end to a point a short distance in front of the chopping-cylinder and is held at said end by a pair of eyebolts or rods $g'$, which pass upwardly through the cross-timber A' and are secured by nuts, as shown in Fig. 1. By this means the tops of the stalks are drawn inward in front of the chopping-cylinder and bent forward as the machine moves along, so that the said stalks will be thoroughly chopped up by the blades, as will be obvious.

In operation the axle and all the parts mounted thereon, whether loosely or rigidly, rotate together; but it is sometimes desirable, for the purposes of cleaning the machine or for avoiding its becoming choked with earth or trash, to have the angular roller F cease to rotate while the chopping-cylinder is rotating. For accomplishing this purpose I provide a pair of clamping devices K, which are pivoted upon the side timbers of the frame of the machine and have downwardly-extending arms $k$, which, when in use, inclose the side faces of the square nut or sleeve F', which is fixed upon the axle, and thus hold the axle and all parts fixed thereon against rotation. The end disks H of the chopping-cylinder, however, may rotate upon the cylindrical sleeves F', as above described, and thus it will be seen that any trash or dirt becoming caught between the inner edges of the chopping-blades and the outer faces of the angular roller F will be so torn to pieces and disintegrated that it will readily fall out. I may also, if desired, provide another means for stopping the rotation of the axle G, either as a substitute for or in addition to the means hereinbefore described, which consists in providing an opening (not shown) in the journaled portion at each end of the axle for the reception of a pin, and providing also an opening $a$ in each of the side timbers coincident with the plane of rotation of the said openings in the axle for the insertion of the pin, as shown in Fig. 1. I may use either one or both of these devices for stopping the rotation of the axle, but I prefer to provide both, so that in case the one means should fail to work the other may be brought into use.

I may use any suitable kind of a seat, which may be mounted upon the framework at any suitable point for the driver; but as I do not wish to limit myself to any particular form I have not herein shown or described any such form particularly.

It will be obvious that many modifications of the herein-described devices might be made which could be used without departing from the spirit of my invention.

Having thus described my invention, what I claim, and desire to secure by Letters Patent of the United States, is—

1. In a stalk-chopper the combination with a frame having a pair of side timbers; of an axle journaled at its ends in said side timbers; a roller fixed on said axle; a chopping-cylinder loosely mounted upon said axle; and inclosing said rollers; and means for stopping the rotation of said roller during the rotation of said chopping-cylinder, substantially as described.

2. In a stalk-chopper, the combination with a frame having a pair of side timbers; of an axle journaled at its ends in said side timbers; a roller fixed on said axle; a pair of cylindrical sleeves also fixed on said axle at opposite ends of said roller; a chopping-cylinder having end disks rotatably mounted upon said cylindrical sleeves, and inclosing said roller; and means for stopping the rotation of said axle during the rotation of said chopping-cylinder, substantially as described.

3. In a stalk-chopper, the combination with a frame; of an axle journaled in said frame; a prismatoidal roller fixed upon said axle; a pair of cylindrical sleeves also fixed upon said axle, at opposite ends of said roller; a squared collar fixed on said axle; a clamping device mounted upon the frame and adapted to engage said squared collar, and thus stop the rotation of said axle and roller; and a cylinder having a pair of end disks rotatably mounted upon said cylindrical sleeves, and a plurality of chopping-blades radially mounted in the peripheries of said disks, substantially as described.

4. In a stalk-chopper, the combination with a frame; of an axle journaled in said frame; a prismatoidal roller fixed upon said axle; a pair of disks rotatably mounted upon said axle; a plurality of radial chopping-blades mounted in slots in the peripheries of said disks, and each provided with openings for the reception of binding-rods; a pair of curved binding-rods mounted in said openings and binding said chopping-blades upon said disks; and means for stopping the rotation of said axle and roller during the rotation of said disks, substantially as described.

5. In a stalk-chopper, the combination with a frame; of an axle journaled in said frame;

a prismatoidal roller fixed upon said axle; a pair of cylindrical sleeves fixed upon said axle at opposite ends of said roller; a pair of disks rotatably mounted upon said cylindrical sleeves; a plurality of radial chopping-blades mounted in radial slots in the peripheries of said disks, and each provided with openings for the reception of binding-rods; a pair of curved binding-rods mounted in said openings and binding said chopping-blades upon said disks; a pair of squared nuts fixed on said axle adjacent to said cylindrical sleeves, a pair of clamping devices pivoted upon said frame and adapted to engage said squared nuts, and hold said axle and roller against rotation during the rotation of said disks and chopping-blades, substantially as described.

6. In a stalk-chopper, the combination with a frame having a pair of side timbers; of an axle journaled at its ends in said side timbers; a roller fixed on said axle; a chopping-cylinder loosely mounted upon said axle; and inclosing said roller; a rearwardly-converging frame mounted in front of said chopping-cylinder for gathering the stalks together in front thereof; and means for stopping the rotation of said roller during the rotation of said chopping-cylinder, substantially as described.

7. In a stalk-chopper, the combination with a frame having a pair of side timbers; of an axle journaled at its ends in said side timbers; a roller fixed on said axle; a pair of cylindrical sleeves also fixed on said axle at opposite ends of said roller; a chopping-cylinder having end disks rotatably mounted upon said cylindrical sleeves, and inclosing said roller; a rearwardly-converging frame mounted in front of said chopping-cylinder for gathering the stalks together in front thereof; and means for stopping the rotation of said axle during the rotation of said chopping-cylinder, substantially as described.

In testimony whereof I affix my signature in presence of two witnesses.

DABNEY GRAY IRBY.

Witnesses:
   G. W. HYDE,
   G. B. FULTZ.